United States Patent [19]
Connell

[11] Patent Number: 4,461,370
[45] Date of Patent: Jul. 24, 1984

[54] COLLAPSIBLE SAWHORSE BRACKET

[75] Inventor: Edwin A. Connell, Hendersonville, N.C.

[73] Assignee: Action Group, Inc., Newark, Ohio

[21] Appl. No.: 512,747

[22] Filed: Jul. 11, 1983

[51] Int. Cl.[3] ........................ B27B 21/00; F16M 11/00
[52] U.S. Cl. ...................................... 182/153; 182/181; 182/225
[58] Field of Search ............... 182/153, 155, 221, 225, 182/226, 181, 182, 183, 184

[56] References Cited

U.S. PATENT DOCUMENTS 1,398,471 11/1921 Smart .................................. 182/186
1,685,283 9/1928 Gibson ................................ 182/186
1,881,755 10/1932 Logan et al. ........................ 182/186
2,136,420 11/1938 Edwards ............................. 182/226
2,198,956 4/1940 Thielepape .......................... 182/181
2,427,679 1/1946 Larson ................................ 182/153
2,555,503 6/1951 Morton ............................... 182/226
2,812,219 11/1957 Lange .................................. 182/185
3,064,756 11/1962 Finizza ................................ 182/181
4,238,001 12/1980 Alexander ........................... 182/153

*Primary Examiner*—Reinaldo P. Machado
*Attorney, Agent, or Firm*—Roylance, Abrams, Berdo & Goodman

[57] ABSTRACT

A collapsible sawhorse bracket comprising a main member coupled to the sawhorse cross beam, a first leg member pivotally coupled to the main member and coupledto a sawhorse leg, and a second leg member pivotally coupled to the main member and coupled to another sawhorse leg. The main member is formed as one-piece with a central portion having depending side walls thereby defining a substantially U-shaped cross section, as are the two leg members. The leg members are pivotally coupled to the main member by a pair of bolts passing through various sets of aligned apertures in the main and leg member side walls. Bores in the main member side walls releasably receive bosses extending from the leg member side walls to releasably lock the leg members in outwardly extending positions.

19 Claims, 7 Drawing Figures

COLLAPSIBLE SAWHORSE BRACKET

FIELD OF THE INVENTION

The invention relates to a collapsible sawhorse bracket having a main member connected to a sawhorse cross beam and a pair of leg members coupled to the sawhorse legs and pivotally coupled to the main member.

BACKGROUND OF THE INVENTION

Sawhorses are well known in the art for providing portable stands for sawing material and for supporting various objects such as boards or planks. Conventional sawhorses made with preformed brackets typically use as the cross beam a 2×4 piece of wood with the smaller edge facing upwardly. This provides a very small surface to support the material on and thus usually demands the use of a second sawhorse.

Moreover, sawhorses are usually made with four fixed legs, two at each end, which results in a storage problem. To overcome this, the prior art discloses collapsible sawhorses using collapsible brackets; however, there are numerous disadvantages to these prior art collapsible sawhorses.

For one thing, their brackets are usually formed of molded metal or require numerous pieces, resulting in an expensive bracket which is difficult to attach to the cross beam or legs of the sawhorse. For another thing, numerous collapsible sawhorses utilize piano hinges which are again expensive to manufacture. For a third, many brackets can only fit one size of cross beam.

Examples of these prior sawhorse brackets are disclosed in the following U.S. Pat. Nos. 1,398,471 to Smart; 1,685,283 to Gibson; 1,881,755 to Logan et al; 2,198,956 to Thielepaper; 2,427,679 to Larson; 2,812,219 to Lange; 3,064,756 to Finizza; and 4,238,001 to Alexander.

Thus, there is a continuing need for improvement in manufacturing sawhorse brackets.

SUMMARY

Accordingly, a primary object of the present invention is to provide a simple and inexpensive sawhorse bracket that is capable of collapsing when desired and comprises merely three pieces, each stamped rather than molded.

Another object of the invention is to provide a sawhorse bracket that is easy to attach to the sawhorse cross beam and legs and avoids expensive hinges.

Another object of the invention is to provide a collapsible sawhorse bracket that can fit various sizes of cross beams so that sawing of various materials can be accomplished using merely one sawhorse.

The foregoing objects are basically attained by providing a collapsible sawhorse bracket, the combination comprising: a one-piece main member having a substantially U-shaped transverse cross section defined by a central portion and two depending side walls, the central portion having means for receiving a fastener to connect the main member to a sawhorse cross beam; first and second leg members, each formed as one-piece and having a central portion and two depending side walls, each of the leg members having means for connecting a sawhorse leg thereto; first means for pivotally coupling the main member side walls to the first leg member side walls; and second means for pivotally coupling the main member side walls to the second leg member side walls.

Advantageously, each one-piece member is formed as a substantially U-shaped metal stamping and the means for pivotally coupling the leg members to the main member comprises a pair of bolts passing through suitably aligned apertures in the main and leg members side walls.

Other objects, advantages and salient features of the invention will become apparent from the following detailed description which, taken in conjunction with the annexed drawings, discloses a preferred embodiment of the invention.

DRAWINGS

Referring now to the drawings which form a part of this original disclosure;

DETAILED DESCRIPTION OF THE INVENTION

Figure 1:
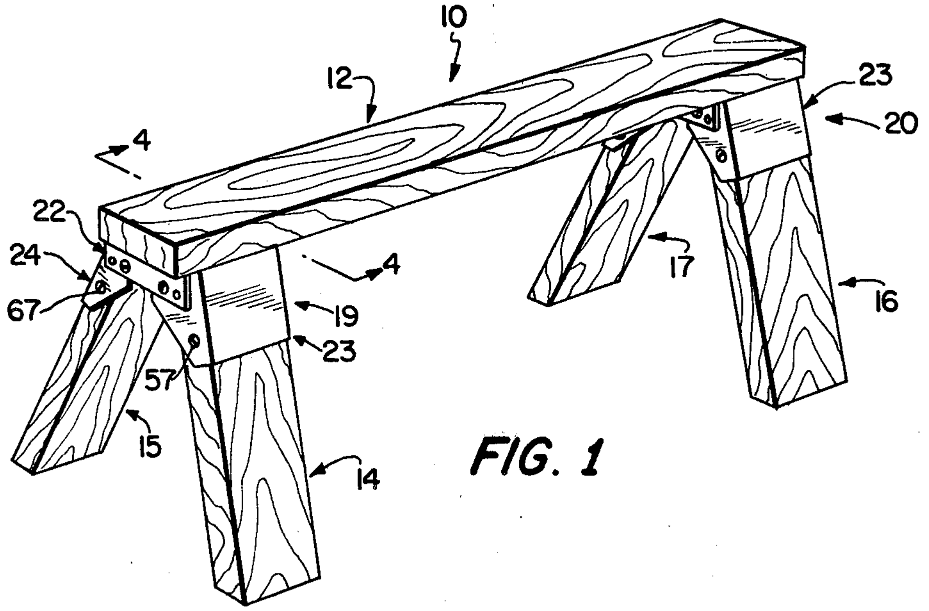
FIG. 1 is a right perspective view of a collapsible sawhorse having the sawhorse brackets in accordance with the invention used thereon.
Figure 2:
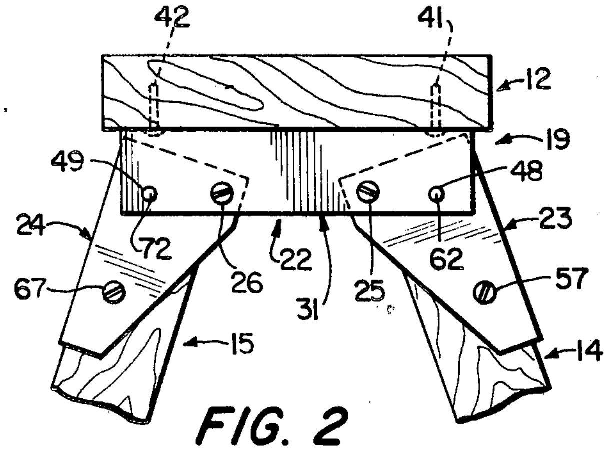
FIG. 2 is an enlarged, fragmentary end view of the sawhorse shown in FIG. 1 with the legs in the outwardly extended position to support the sawhorse in an upright position.
Figure 3:
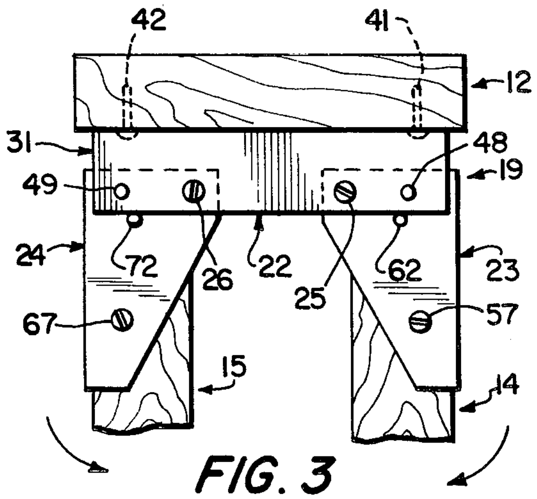
FIG. 3 is an enlarged fragmentary, end view similar to that shown in FIG. 2 except that the legs of the sawhorse have been pivoted inwardly into the collapsed, storage position.
Figure 5:
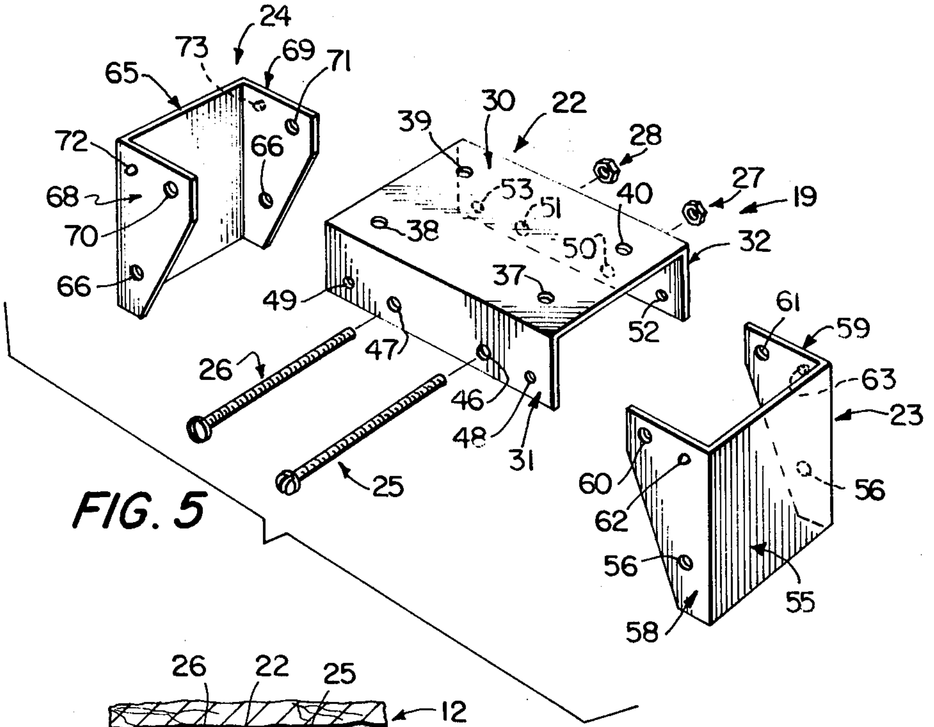
FIG. 5 is an enlarged left exploded perspective view of the collapsible sawhorse bracket in accordance with the invention.
Figure 6:
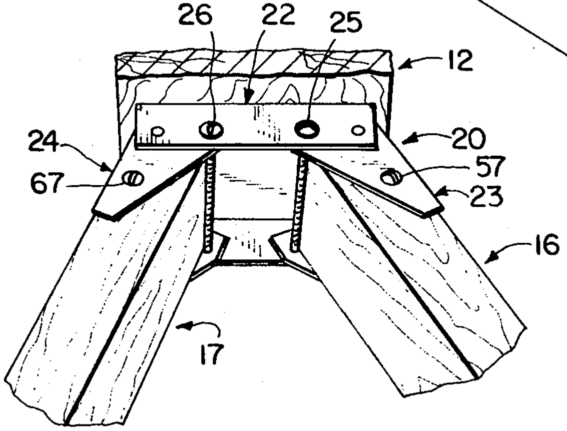
FIG. 6 is a fragmentary bottom perspective view of one of the sawhorse brackets shown in FIG. 1.

As seen in FIGS. 1–4, the collapsible sawhorse 10 comprises a horizontally oriented cross beam 12, a first pair of legs 14 and 15 at one end, a second pair of legs 16 and 17 at the other end, and a pair of brackets 19 and 20 for pivotally coupling, respectively, legs 14 and 15 and legs 16 and 17 to the cross beam. These brackets 19 and 20 are collapsible as seen in FIG. 3 to provide easy storage, can accommodate various sized cross beams as illustrated in FIGS. 2 and 6, and are formed from simple metal stampings as seen in FIG. 5.

Referring again to FIG. 1, the cross beam can be a 2×6 piece of lumber or wider since it is supported by the flat upper surfaces of the brackets. The legs are advantageously 2×4 pieces of lumber which are sized to be connected to each of the brackets.

Each bracket 19 and 20 is similarly constructed so only one will be described in detail. Thus, bracket 19 as seen best in FIG. 5 comprises a one-piece main member 22, a one-piece leg member 23, a one-piece leg member 24, a pair of bolts 25 and 26, and a pair of nuts 27 and 28.

The main member 22 is formed as a mmtal stamping in a substantially U-shaped configuration in transverse cross section and includes a substantially planar, rectangular central portion 30, a rectangular, substantially planar left side wall 31, and a rectangular, substantially planar right side wall 32. The side walls are substantially perpendicular to the central portion 30 and extend downwardly therefrom. The intersection of the walls and the central portion include a 1/16 inch radius of curvature resulting from the stamping action.

Figure 4:
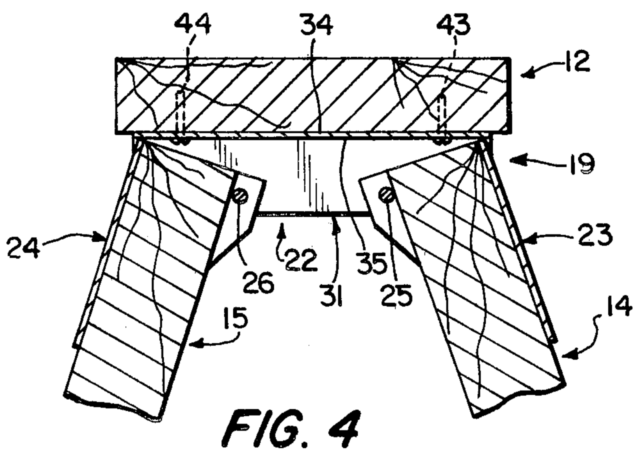
FIG. 4 is an enlarged fragmentary elevational view in section taken along lines 4—4 in FIG. 1.

The central portion 30 as seen in FIG. 4 has an upper surface 34 contacting the lower surface of the cross beam 12 and a lower surface 35 contacting the leg members 23 and 24. The central portion 30 has four bores 37–40 therein for receiving four fasteners such as screws 41–44 to couple the bracket 19 to the bottom of the cross beam 12 as illustrated in FIGS. 2–4.

As seen in FIG. 5, the left side wall 31 has first and second apertures 46 and 47 formed therein about one-third in from the opposite ends of the side wall and a pair of smaller bores 48 and 49 adjacent the ends. Similarly, the right side wall 32 has third and fourth apertures 50 and 51 aligned respectively with apertures 46 and 47 as well as bores 52 and 53 aligned respectively with bores 48 and 49 in the left side wall. Apertures 46 and 50 will receive bolt 25 therein to pivotally couple leg member 23 to the main member 22 and apertures 47 and 51 will receive bolt 26 to pivotally couple leg member 24 to the main member. Bores 48, 49, 52 and 53 form a part of a releasable locking assembly which works in connection with bosses formed on the leg members, as will be described in more detail hereinafter.

Each of the leg members 23 and 24 is formed as a metal stamping and is U-shaped in transverse cross section, these leg members being formed substantially identically. Leg member 23 comprises a rectangular, substantially planar central portion 55, a left side wall 58 and a right side wall 59, which side walls are substantially planar and are substantially perpendicular to central portion 55 and extending therefrom with an included radius of curvature of 1/16 inch from the stamping action. Each of the side walls 58 and 59 has a bore 56 therein for receiving a fastener such as screw 57 therein to fasten leg 16 thereto, as seen in FIGS. 1–3, 5 and 6. In the upper left-hand corners as seen in FIG. 5 each of the side walls 58 and 59 has respectively a fifth aperture 60 and a sixth aperture 61, these apertures being aligned and receiving bolt 25 therein as illustrated in FIGS. 2–7. Rigidly coupled on the outer surfaces of the left and right side walls 58 and 59 are a pair of outwardly extending, hemispherical bosses 62 and 63 for releasable engagement with bores 48 and 52 in the main member 22 as illustrated in FIG. 2.

The second leg member 24 is similarly constructed and includes a central portion 65, a left side wall 68, a right side wall 69, aligned seventh and eighth apertures 70 and 71 in the side walls for receiving bolt 28, and aligned bosses 72 and 73. Each of the side walls 68 and 69 has a bore 66 therein for receiving a fastener such as screw 67.

Bosses 62 and 63 on the first leg member 23 releasably lock leg member 23 in the outwardly extending position shown in FIG. 2 by releasable locking engagement in bores 48 and 52 on the main member. Similarly, bosses 72 and 73 releasably lock the second leg member 24 in the outwardly extending position by releasable engagement with bores 49 and 53 in the main member. Thus, the sawhorse bracket will remain in the outwardly extending position while it is moved from place to place although it can be collapsed for storage by an inwardly exerted force which releases the bosses from their connection in the bores as illustrated in FIG. 3.

Figure 7:
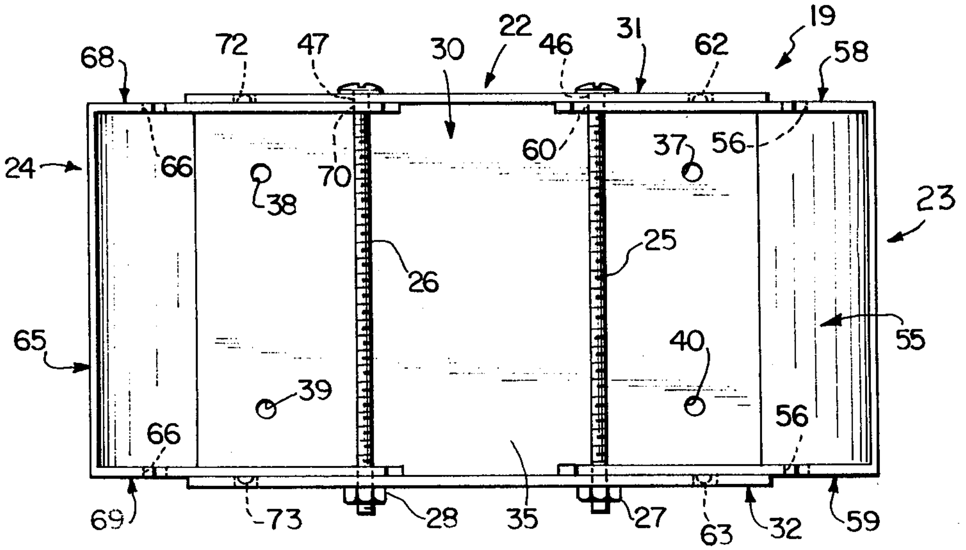
FIG. 7 is an enlarged, bottom plan view of the sawhorse bracket in accordance with the invention in the outwardly extending position shown in FIG. 2 but without the legs or cross beam.

As best seen in FIG. 4, bolts 25 and 26 act as first and second pivot pins to pivotally couple each of the leg members to the main member as described above. These bolts are secured in place as illustrated in FIG. 7 by means of nuts 27 and 28. Advantageously, each leg 14 and 15 is received respectively between the side walls of the leg members 23 and 24 and between the pivot bolts and the central portions thereof as illustrated in FIG. 4 and are fastened by screws 57 and 67. Legs 16 and 17 are similarly connected to the other leg members in bracket 20 as seen in FIG. 1.

As seen in FIG. 7, the side walls of the leg members are sized to fit between the main member side walls. In assembling the bracket, the side walls of the leg members are received between the side walls of the main member, the apertures in these six side walls are suitably aligned, and bolts 25 and 26 are passed therethrough to pivotally couple the leg members to the main member.

In the outwardly extending position illustrated in FIGS. 1, 2 and 4, the upper edge of the central portions of each leg member engages the lower surface 35 of the main member to limit the outward extension of the legs when force is applied downwardly on the cross beam 12. The legs themselves also engage the bolts to provide added resistance.

Thus, by forming the main member and leg members as simple metal stampings an inexpensive and uncomplicated collapsible bracket is provided and by using the pair of bolts and associated apertures in the main and leg members of simple, inexpensive pivotal connection is provided. Moreover, by providing a flat upper surface to the main member, a variety of sized cross beams can be accommodated.

While one advantageous embodiment has been chosen to illustrate the invention, it will be understood by those skilled in the art that various changes and modifications can be made therein without departing from the scope of the invention as defined in the appended claims.

What is claimed is:

1. A collapsible sawhorse bracket, the combination comprising:

a one-piece main member having a substantially U-shaped transverse cross section defined by a central portion and two depending side walls, said central portion having means for receiving a fastener to connect said main member to a sawhorse cross beam;

first and second leg members, each formed as one-piece and having a central portion and two depending side walls, each of said leg members having means for connecting a sawhorse leg thereto;

first means for pivotally coupling said main member side walls to said first leg member side walls; and second means for pivotally coupling said main member side walls to said second leg member side walls.

2. A bracket according to claim 1, wherein said main member central portion is substantially planar.

3. A bracket according to claim 1, wherein said main member side walls are substantially perpendicular to said main member central portion.

4. A bracket according to claim 1, wherein said main member side walls are substantially planar.

5. A bracket according to claim 2, wherein said main member side walls are substantially planar.

6. A bracket according to claim 1, wherein said leg member control portions and side walls are substantially planar.

7. A bracket according to claim 1, wherein
said leg member side walls are substantially perpendicular to their respective central portions.

8. A bracket according to claim 1, wherein
said first means comprises a pair of aligned apertures in said main member side walls, a pair of aligned apertures in said first leg member side walls and a pin received in these pairs of apertures.

9. a bracket according to claim 8, wherein
said second means comprises a second pair of aligned apertures in said main member side walls, a second pair of aligned apertures in said second leg member side walls and a second pin in these second pairs of apertures.

10. A bracket according to claim 9, wherein
said pin is a threaded bolt, and
said second pin is a threaded bolt.

11. A bracket according to claim 1, wherein
said means for receiving a fastener to connect said main member to a sawhorse cross beam comprises a bore.

12. A bracket according to claim 1, and further comprising
third means for releasably locking said first leg member in an outwardly extending position relative to said main member, and
fourth means for releasably locking said second leg member in an outwardly extending position relative to said main member.

13. A bracket according to claim 12, wherein
said third means comprises a bore in one of said main member side walls and a boss coupled to one of said first leg member side walls, said boss being releasably receivable in said bore, and
said fourth means comprises a second bore in one of said main member side walls and a second boss coupled to one of said second leg member side walls, said second boss being releasably receivable in said second bore.

14. A bracket according to claim 1, wherein
said leg members are each substantially U-shaped in transverse cross section.

15. A collapsible sawhorse bracket, the combination comprising:
a pair of pivot pins;
a one-piece main member having a central portion and two depending side walls,
said central portion having a plurality of bores for receiving fasteners to connect the main member to a sawhorse cross beam,
said side walls each having a pair of apertures for receiving said pair of pins therein; and
first and second one-piece leg members, each having a central portion and two depending side walls,
each of said leg members having at least one aperture for receiving a fastener to connect a sawhorse leg thereto,
said side walls in each of said leg members having a pair of apertures for receiving one of said pair of pins therein.

16. A bracket according to claim 15, and further comprising
means for releasably locking said first leg member in an outwardly extending position relative to said main member, and
means for releasably locking said second leg member in an outwardly extending position relative to said main member.

17. A bracket according to claim 15, wherein
said main member is substantially U-shaped in transverse cross section.

18. A bracket according to claim 15, wherein
said leg members are each substantially U-shaped in transverse cross section.

19. A bracket according to claim 17, wherein
said leg members are each substantially U-shaped in transverse cross section.

* * * * *